US006834693B1

(12) United States Patent
Calvar et al.

(10) Patent No.: US 6,834,693 B1
(45) Date of Patent: Dec. 28, 2004

(54) ELECTRICALLY CONDUCTIVE TIRE AND EXTRUSION EQUIPMENT FOR A SECTION WITH A CONDUCTIVE INSERT

(75) Inventors: Didier Calvar, Beaumont (FR); Serge Nicolas, Clermont-Ferrand (FR); Daniel Bardy, Clermont-Ferrand (FR)

(73) Assignee: Compagnie Generle des Etablissements Michelin-Michelin & Cie, Clermont-Ferrand Cedex (FR)

(*) Notice: Subject to any disclaimer, the term of this patent is extended or adjusted under 35 U.S.C. 154(b) by 0 days.

(21) Appl. No.: 09/645,096

(22) Filed: Aug. 24, 2000

Related U.S. Application Data

(63) Continuation of application No. PCT/EP99/01042, filed on Feb. 17, 1999.

(30) Foreign Application Priority Data

Feb. 26, 1998 (FR) .............................. 98 02460

(51) Int. Cl.⁷ .................... B29C 47/06; B29C 47/12; B29D 30/52; B60C 1/00; B60C 19/08
(52) U.S. Cl. ................... 152/152.1; 152/209.5; 152/DIG. 2; 156/244.11; 156/501; 264/167; 264/173.1; 264/173.17; 264/174.11; 425/131.1; 425/380; 425/462; 425/465
(58) Field of Search .................... 156/244.11, 500, 156/501, 110.1, 177, 439; 264/167, 173.11, 173.12, 173.17, 174.11, 177.16, 105, 173.1; 425/131.1, 133.5, 462, 325, 375, 380, 465; 152/152.1, 209.5, DIG. 2

(56) References Cited

U.S. PATENT DOCUMENTS 2,239,070 A * 4/1941 Work et al.

2,960,138 A * 11/1960 ChiodO (List continued on next page.)

FOREIGN PATENT DOCUMENTS

| DE | 19802088 | * 7/1999 |
|---|---|---|
| EP | 0104133 | 3/1984 |
| EP | 0609550 | 8/1994 |
| EP | 0658452 | 6/1995 |
| EP | 0718127 | 6/1996 |
| EP | 0753391 | 1/1997 |
| EP | 881060 | * 12/1998 |
| JP | 59-48137 | * 3/1984 |
| JP | 11-20426 | * 1/1999 |
| JP | 11-48711 | * 2/1999 |
| WO | WO 98/38050 | * 9/1998 |
| WO | WO 99/43505 | * 9/1999 |

Primary Examiner—Steven D. Maki
(74) Attorney, Agent, or Firm—Baker Botts

(57) ABSTRACT

A tire having a tread consisting of two circumferential layers of non-conductive material, each layer containing a circumferential insert made of a conductive mix and having on the contact surface between the two layers a circumferential footprint, the first of these layers having on the said surface a circumferential footprint with a circular path of width e, the second layer having on the said surface a circumferential footprint of width e' lying across and having crests on either side of the circular path of the first layer, such that circumferentially between the two paths there are numerous points of contact which ensure electrical connection between the two conductive elements. The second layer with its insert is extruded from a main extruder for the extrusion of the portion of a tread in the unvulcanized condition, and a micro-extruder whose extrusion nozzle is fitted with a cutting edge and whose extrusion orifice is directed against a conveyor associated with the main extruder.

11 Claims, 4 Drawing Sheets

U.S. PATENT DOCUMENTS

| | | | |
|---|---|---|---|
| 3,099,859 A | * | 8/1963 | Eilersen |
| 3,274,646 A | * | 9/1966 | Krystof |
| 3,565,737 A | * | 2/1971 | Lefevre et al. |
| 3,761,341 A | * | 9/1973 | Kimble |
| 3,768,537 A | * | 10/1973 | Hess et al. |
| 4,106,965 A | * | 8/1978 | Lee .............................. 156/123 |
| 4,539,169 A | * | 9/1985 | Nixon et al. |
| 4,556,376 A | * | 12/1985 | Sievers et al. |
| 4,927,482 A | * | 5/1990 | Capelle |
| 5,017,118 A | | 5/1991 | Looman et al. |
| 5,174,939 A | * | 12/1992 | Siegenthaler |
| 5,453,238 A | | 9/1995 | Bardy |
| 5,538,742 A | * | 7/1996 | McHale et al. |
| 5,937,926 A | * | 8/1999 | Powell |
| 5,942,069 A | * | 8/1999 | Gerresheim et al. |
| 6,202,724 B1 | * | 3/2001 | Hiruma et al. |
| 6,269,854 B1 | * | 8/2001 | Matsuo et al. |
| 6,294,119 B1 | * | 9/2001 | Nakamura |
| 2001/0224100 | * | 9/2001 | Benatti |

\* cited by examiner

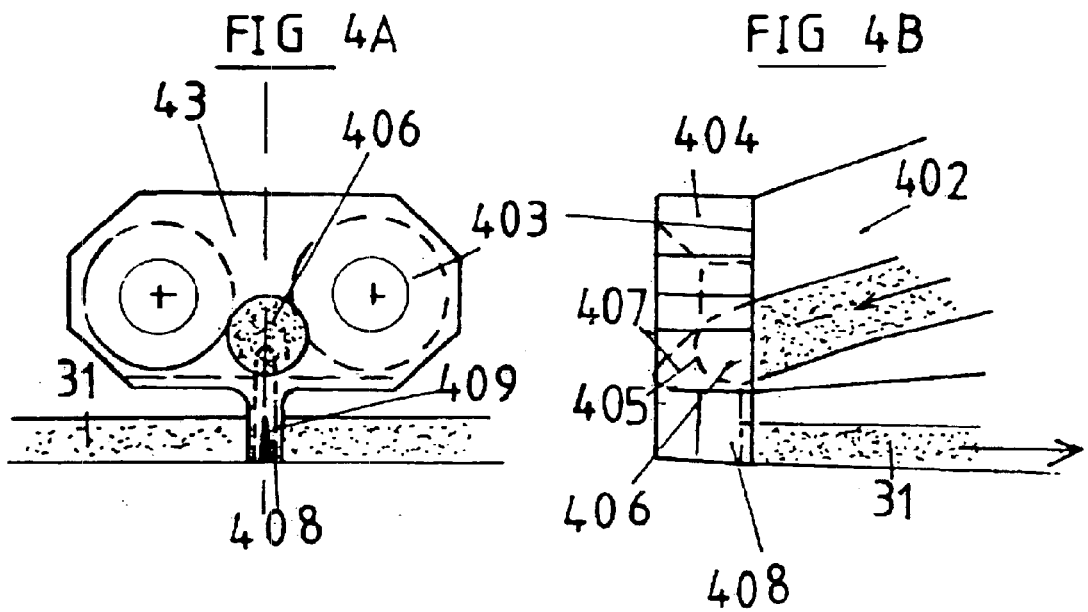
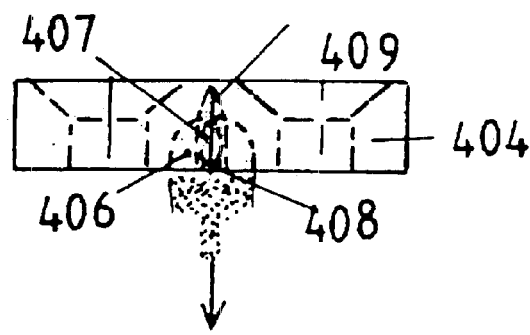
FIG 4A
FIG 4B
FIG 4C

ELECTRICALLY CONDUCTIVE TIRE AND EXTRUSION EQUIPMENT FOR A SECTION WITH A CONDUCTIVE INSERT

This is a continuation of PCT/EP99/01042 filed Feb. 17, 1999.

BACKGROUND OF THE INVENTION

The object of the present invention is a tire made from several mixes comprising as the principal charge a non-reinforcing charge such as silica, or mixes with low carbon black contents, at least one of these mixes forming the tread. More particularly, it concerns a tire whose internal temperature may increase not inconsiderably when rolling, such as a tire designed, for example, to support heavy loads. It also concerns a process designed to produce such a tire and equipment for carrying out such a process.

Since environmental problems are becoming increasingly crucial and fuel economy and the suppression of pollution produced by motor vehicles have become a priority, one of the tire manufacturers' objectives is to produce a tire which combines the properties of very low rolling resistance, excellent adhesion to both dry and wet or snow-covered or icy ground, very good wear resistance, and finally low rolling noise.

To achieve that objective, a tire was proposed in European Patent EP A 501 227, which has a tread comprising silica as its main reinforcing charge. Though this solution provides the best compromise between the aforementioned group of very contradictory properties, it has been found that during the operation of the vehicle, tires with a tread whose main reinforcing charge is silica have the disadvantage that they accumulate more or less high levels of static electricity, which is produced by friction between the tire and the road when the vehicle is rolling, because silica is an electrically non-conductive material.

When certain particular conditions co-exist, the static electricity so accumulated in a tire can give rise to a disagreeable shock to the occupant of a vehicle when the occupant touches the vehicle body. It can also hasten the ageing of the tire because of the ozone generated by the electrical discharge. Depending on the nature of the ground and the vehicle, it can in addition cause the radio fitted in the vehicle to function poorly because of the interferences it produces.

This problem of static electricity accumulation in a tire and most of the disadvantages associated therewith is a very old one and already existed when the reinforcing charge used was carbon black.

Patent application EP 0 658 452 A1 describes the adaptation of principles known for a long time, to a so-termed modem tire. This adaptation provides a solution of the main problems associated with the solutions proposed in various older documents, and in particular the harmful heterogeneities introduced in tire structures. The solution proposed is to insert a strip of conductive rubber mix or 'insert', preferably extending all around the circumference of the tire and connecting the surface of the tread either to one of the crown plies, or to the carcass reinforcement, or to any other part of the tire that conducts electricity sufficiently well, the necessary electrical conductivity being conferred by the presence of a suitable form of carbon black.

Though such a solution is perfectly viable for a tire having a tread which consists of just one and the same non-conductive mix, for example the tread of a touring vehicle, this does not apply in the case of a tire comprising several layers of rubber mixes above the crown reinforcement and the carcass reinforcement, as is the case with any tire that can roll with a stable and high operating temperature, such as those fitted to heavy or high-speed vehicles.

In fact, if for any reason it is wished to produce such a tire with a layer or internal portion of the tread (the portion not in contact with the ground), which is non-conductive, between the crown reinforcement and the outer portion of the tread (the portion in contact with the ground) which has been made conductive by the presence of a circumferential insert or striation, the said internal portion must be made conductive. Similarly, a layer between the carcass reinforcement and the crown reinforcement, one which has the familiar excess thickness in the area of the edges of the crown plies, must also be made conductive if it is not already so. A first solution for obtaining a conductive tread is to co-extrude the inside and outside portions of the tread and to provide the combination so formed with a conductive circumferential insert. This solution is unsatisfactory for several reasons, two of which are worth mentioning: in the type of tire considered, the total thickness of the tread is too large; besides, it may be advantageous for the conductive inserts, respectively of the inside and outside layers of the tread not to be made using the same quality of rubber mix.

As described in French Patent Application FR 97/02276, another solution is to provide electrical connection between two conductive layers, or layers rendered conductive, separated by a non-conductive layer, by means of at least one strip of rubber mix with small thickness, width and length, positioned between the two weld faces of the non-conductive layers and in contact with the means used to make the two layers joined by the connection conductive. Though industrially satisfactory, this method entails positioning a supplementary product and therefore involves additional manufacturing costs.

A third solution consists in providing each non-conductive portion with a circumferential insert having a rectilinear circular path, or circular striation, after extrusion of the said portion by the usual extrusion methods, and then joining the two products together before they are positioned on the crown reinforcement. In that the striations are generally very thin so as not to affect the physical properties of the compositions constituting the two portions of the tread, the thickness of these inserts in the tire viewed in cross-section being of the order of 0.01 to 2.0 mm, such a solution entails that the path of the striation in the outside portion of the tread on the contact surface between the two portions should be perfectly aligned with or centered on the path on the said contact surface of the striation in the inside portion of the same tread.

However, the mechanical properties of rubber compositions before vulcanization are very poor, since the raw rubber mix may be in the form of a very soft paste or conversely a very hard agglomerate. Whatever the means used to work such mixtures, it is difficult to achieve perfect control of the geometry of the semi-finished product consisting of the combination of the two unvulcanized portions of the tread: coincidence or alignment between the respective paths of the two striations on the contact surface between the two portions is very difficult to achieve, so the solution involving two circular striations cannot be considered structurally optimized and industrially viable, from the standpoint either of cost or of the performance obtained. The manufacture of a tire designed in this way would be more akin to precision engineering than to an industrial process.

SUMMARY OF THE INVENTION

One of the invention's aims is to dissipate electrostatic charges induced by the rolling of a tire comprising several electrically non-conductive mixes without significantly affecting the properties of the tire. Another aim is to obtain a tire as simple and cheap as possible to produce in terms of the material costs and/or manufacturing costs involved.

The present invention proposes a tire comprising at least two radially adjacent layers of electrically non-conductive rubber mixes the said two layers sharing a common contact surface, characterized in that each layer contains a circumferential insert of electrically conductive mix whose footprint on the said contact interface is circumferential, the insert of the first of these layers having on the said contact surface a circumferential footprint of circular path of width e, the insert of the second layer having on the contact surface a circumferential footprint with a path of width e' which crosses and presents crests on either side of the circular path of the first layer insert, such that around the circumference there are numerous points of contact between the two paths which ensure electrical connection between the two conductive elements, and the second layer insert has a maximum crest-to-crest width at least equal to 10 mm.

The path of the circumferential footprint of the second layer insert which is the most simple to produce industrially, is an undulating path and more particularly a periodic path. A path is termed periodic when it can be represented by a periodic function and could be, for example, an undulating path, a zigzag path, a path consisting of triangles, a sinusoidal path, or a path consisting of rectangles or trapezoids. Thus, the said path can be defined by an amplitude and a wavelength, by analogy with periodic motions. The amplitude a may very along the circumference of the contact surface between the layers, but is preferably constant, and the median axes of the two paths on the contact surface will be parallel to and separated from the equatorial plane of the tire by distances whose difference is at most equal to half the amplitude a/2 of the said periodic path.

It is advantageous because most simple, for each layer to contain an insert which, when viewed in cross-section, has a rectangular area over the full thickness of the layer.

In by far the majority of cases, the two non-conductive layers will be the inside and outside portions of the tread and electrical connection must be ensured between the ground and the crown reinforcement consisting of metallic cables set in a rubber mix that has been made conductive by the presence of carbon black in its composition. The non-conductive layers may also be on the one hand a profile of triangular cross-section that separates the carcass reinforcement from an edge of the crown reinforcement, and on the other hand the inside and outside portions of the tread. Connection must then be ensured between all three layers.

In the case of a tread, it is best for the portion of the said tread having an insert with a circumferential footprint of circular path on the contact surface between the two portions, to be the outer part of the tread, the other portion, preferably the inner part of the tread, being provided with a striation whose circumferential surface has a periodic path, preferably undulating.

A layer, whether it is part of the tread or an intermediate section between the carcass reinforcement and the crown reinforcement, is generally obtained in the non-vulcanized state by extrusion using an extruder. The process designed to obtain the combination of the two layers which are to be conductive, for example the portions of a tire tread, consists in the separate extrusion of each layer, for example each portion of the tread, inserting in each layer a striation, which is circumferential and rectilinear in one layer, for example the outer portion of the tread, but which is periodic in the other layer, or example the inner portion of the said tread, and then joining the two layers by the usual methods, for example the two said portions, to form the unvulcanized tread. The process according to the invention for obtaining the layer with a periodic striation consists in the following:

extruding the said layer using an extruder comprising an extrusion head provided with a flow channel which opens into an extrusion orifice, cutting the section produced, positioned on a means of conveyance located downstream from the extrusion orifice, with the aid of a cutting device, extruding the striation of conductive rubber mix in the unvulcanized condition and inserting it between the two walls of the cut by means of the nozzle of a mobile micro-extruder, the said nozzle being directed against the wall of the said means of conveyance and undergoing a periodic movement parallel to the said wall and of amplitude at least equal to 10 mm.

Advantageously, the process according to the invention uses an extruder familiarly known as a roller die extruder, in which the profile or section of the product extruded is defined on the one hand by the surface of the roller onto which the rubber mix is extruded and on the other hand by the fixed wall of an extrusion blade which cooperates with the said surface to delimit an extrusion orifice. The process is therefore derived from that previously described in that the nozzle of the micro-extruder is directed against the wall of the roller, which is a means of conveyance, and undergoes a periodic movement parallel to the said wall.

The invention also concerns the equipment designed to carry out the process of obtaining a layer, for example the inside of the tread, provided with a striation of periodic path, as described above. The said equipment comprises a normal extruder, also known as a flat die extruder, or a roller die extruder, for the extrusion of the said layer in the unvulcanized condition, and a micro-extruder fitted permanently on a support which also enables the said micro-extruder to be displaced along the three main directions, the said micro-extruder comprising mainly an extrusion head fined at its end with a nozzle designed to extrude the circumferential insert, with the desired section and path, into the section of unvulcanized mix emerging from the main extruder. The end of the said nozzle is directed against the roller of the main extruder or against the wall of the means of conveyance of the treated portion of the tread. More particularly, the invention concerns the nozzle or extrusion orifice of the micro-extruder used. The said nozzle is characterized in that it comprises a contact surface for attachment to the outlet of the micro-extruder by means of the attachment elements required for fixing it, the said surface extending axially to a nozzle head incorporating a hollow feed chamber having, upstream, a sharp cutting edge and provided, downstream, with an extrusion orifice with the desired cross-section through which the conductive rubber material is extruded.

The characteristics of the present invention will be better understood from the description below, which refers to the attached drawing.

DESCRIPTION OF THE DRAWINGS

FIGS. 4A to 4C are views of the nozzle for the extrusion of the striation, FIG. 4A being a front view, FIG. 4B a side view and FIG. 4C a view from above.

DESCRIPTION OF PREFERRED EMBODIMENTS

Figure 1A:
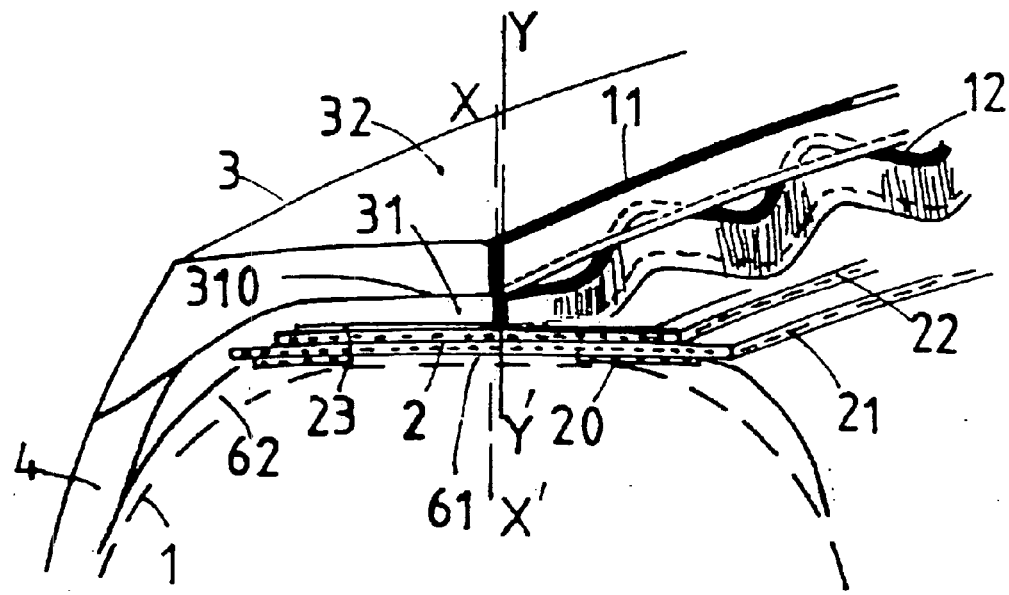
FIG. 1A is a schematic perspective view of the crown portion of a tire with a non-conductive tread.

The tire, of size 315/80.R.22.5, designed to have low rolling resistance, comprises a carcass reinforcement 1 consisting of a metallic ply formed of non-extensible metallic cables covered with a rubber coating mix rendered conductive to electrostatic charges thanks to the incorporation of a carbon black currently used as the reinforcing charge in such mixes. As is known, the said carcass reinforcement 1 is anchored to at least one bead wire in each tire bead, forming a turn-up (not shown). Inside the said carcass reinforcement 1 are the usual reinforcing layers and the layers, known as inner layers, consisting of mixes that are generally impermeable to the known inflation gases. The edge(s) of the/these inner layer(s) is/are generally covered by the axially inside part of the tire bead protection layer (not shown), a wear-resistant layer whose axially outer portion rests against the fining rim. The said layer generally contains a high charge of carbon black and is therefore a good conductor.

The carcass reinforcement 1 is covered at the top by a crown reinforcement 2 consisting, in the example described, of two half-plies called triangulation plies 20 formed of non-extensible metallic cables oriented relative to the circumferential direction by an angle which may range from 30° to 90°; then, radially above these, there are two plies known as working plies 21 and 22 consisting of non-extensible metallic cables crossed over from one ply to the next and making with respect to the circumferential direction angles which may be equal or unequal, whose absolute value ranges from 10° to 30°; and in general, there is then finally at least one ply 23 known as the protection ply, formed of elastic cables which make with respect to the circumferential direction an angle equal in direction and value to the angle of the radially outermost working ply. All the cables of this crown reinforcement 2 are covered by one or more rubber coating mix(es), which conduct electrostatic charges thanks to a carbon black commonly used as a reinforcing charge in such mixes.

Since the crown reinforcement 2 does not have the same cross-section as the underlying carcass reinforcement 1, it is separated from the latter by a rubber combination of small thickness on the axially central portion 61 where the two reinforcements are essentially parallel, and whose thickness on either side of the said axial portion 61 increases towards the outside of the tire to form wedges or triangular sections 62. For reasons to do with heating, the said rubber wedges 62 and axial portion 61 are not made with conductive rubber mixes, because they contain very low charges of carbon black. Radially above the crown reinforcement 2 is positioned the tread 3, which consists of a radially inner layer 31 known as the sub-tread and consisting of a mix whose main charge is silica, the sub-tread 31 itself being covered radially by a radially outer layer 32 or tread layer, which has a very high silica charge. The tread 3 is connected to the tire beads by the mixes forming the side-walls 4, which also contain very high charges of silica.

Figure 1B:
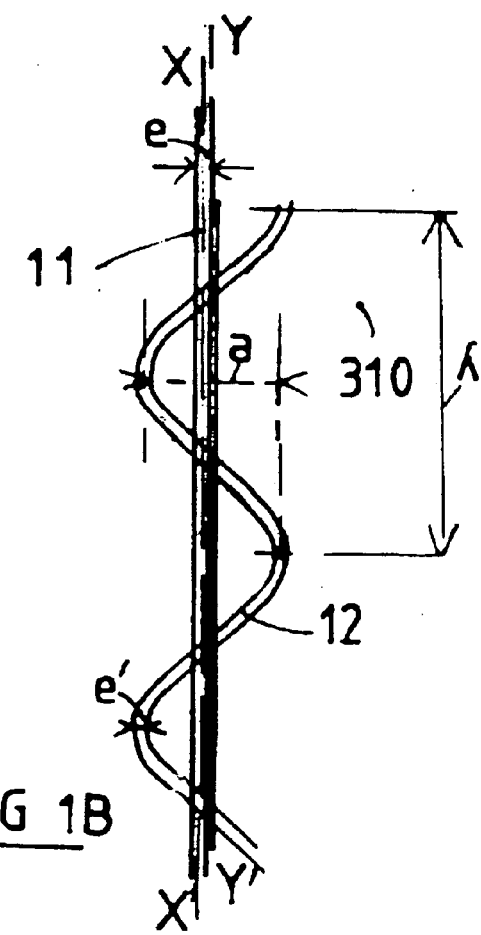
FIG. 1B is a plan view of part of the tread of the said tire.

In a way known in its own right, the tread layer 32 is made conductive by the rubber insert 11, which is in the form of a circumferential ring around the full height of the tread layer 32 so as to connect the surface of the tread that makes contact with the ground to the radially outermost face of the sub-tread 31. This insert 11, whose axial width e is very small, is in the case shown a single insert theoretically centered on the equatorial plane XX' of the tire, and its path along the contact surface 310 between the two portions 31 and 32 of the tread is rectilinear and circular. The insert 11 could be off-center, in particular when there is a central groove in the tread; or there could be two inserts 11, for example positioned symmetrically relative to the equatorial plane, or more, but in any case positioned axially so that contact with the ground can be established however worn the tread might be. The insert(s) 11, which are conductive to electrostatic charges by virtue of their rubber composition with a high content of carbon black, may be produced by any appropriate means, and this, either while the tire is being assembled in the unvulcanized condition or after vulcanization. For example, the insert(s) 11 may be produced by extrusion during the production of the radially outer layer 32 of the tread 3 in the unvulcanized condition. When the radially inside layer 31 has been obtained separately by extrusion, the electrical connection between the tread layer 32, or more precisely between the insert(s) 11 and the radially outermost ply 23 of the crown reinforcement 2 formed of metallic cables covered with a rubber mix charged with a usual type of carbon black and therefore conductive, is effected via (one of) the circumferential insert(s) 12 over the full height of the portion 31 of the tread, whose path(s) of width e' on the contact surface 310 between the two portions 31 and 32 of the tread 3 is/are undulating with a circular median axis YY' theoretically centered on the equatorial plane. The composition of the rubber constituting the connection 12 that conducts electrostatic charges is, like the composition of the insert 11, based on a natural rubber and/or synthetic rubber customarily used for making tires and treads in particular, and containing as its reinforcing charge a conductive carbon black preferably of the type usually used in the fabrication of tires. As shown in FIG. 1B, the said insert 12 has a path or line on the contact surface 310 between the two layers 31 and 32 which is of undulating shape with undulation amplitude a equal to 10 mm, very much larger than the widths e and e' of the respective paths of the inserts 11 and 12 on the said contact surface, these widths being between 0.01 mm and 2 mm and in the case described equal to 0.4 mm. When the two portions of the tread have been positioned, whether on a tire assembly drum or on any other means for joining the said two portions, this arrangement ensures that there will be a number of contact points between the two inserts 11 and 12 regardless of the normally accepted errors in the positioning of the two tread portions relative to one another, known as centering errors (displacement of the median axes of the two inserts 11 and 12, as illustrated in FIGS. 1A and 1B). The number of contact points around the circumference of the inside portion will depend on the wavelength γ chosen or the undulation.

The electrical connection between the crown reinforcement 2 and the carcass reinforcement 1 is effected in the case described by the same system, i.e. by using a circular circumferential insert (not shown), whether continuous or not, with the median axis of the circular path approximately centered on the median axis of the undulating path of the insert 12, such that electrical connection is effected by passage through the portion 61 of small thickness separating the carcass reinforcement 1 from the crown reinforcement 2, or by passage into one of the sections 62 which separates one of the edges of the crown reinforcement 2 from the carcass reinforcement 1.

Figure 2:
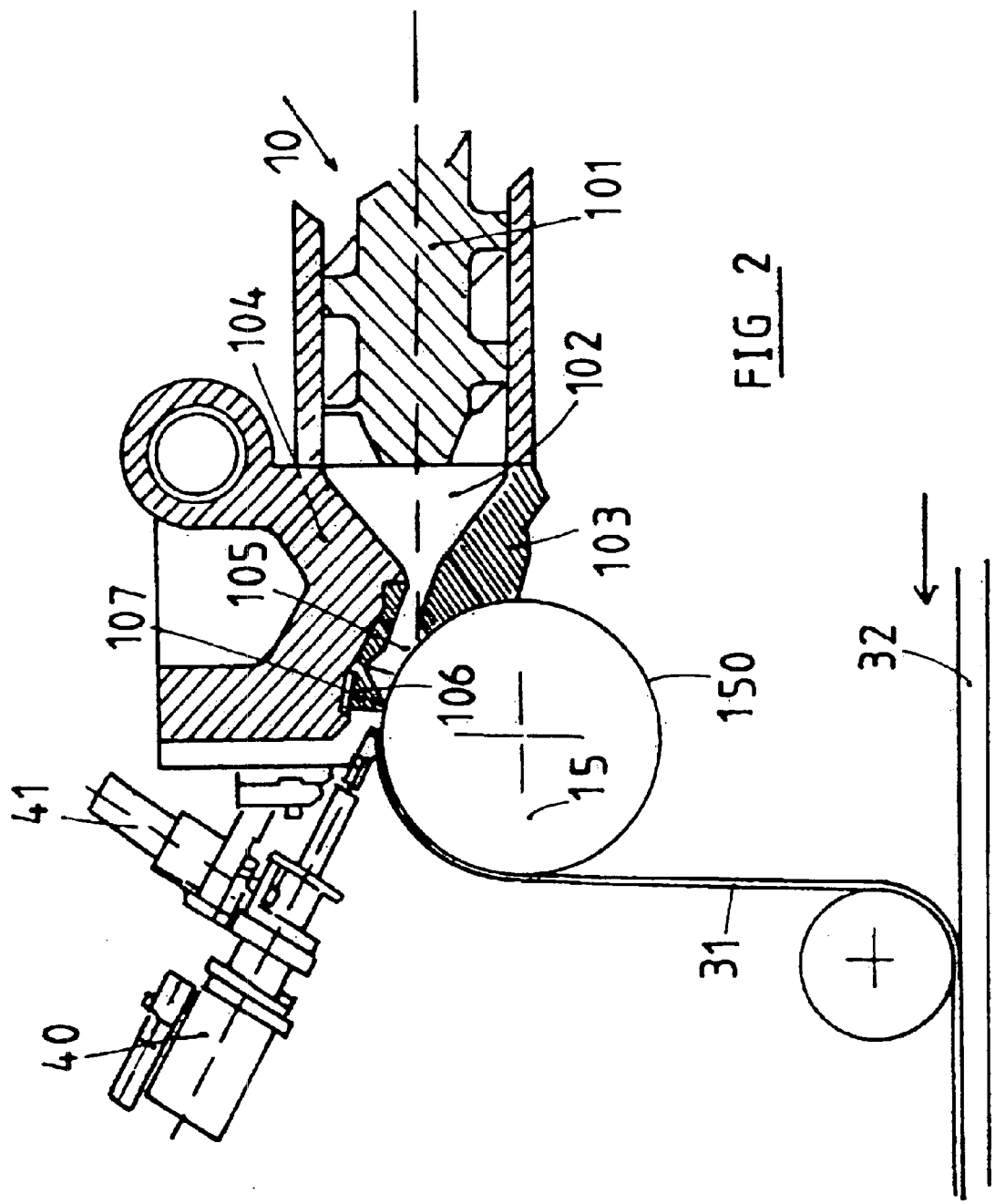
FIG. 2 is an elevational view showing the main components of the device used according to the invention.
Figure 3:
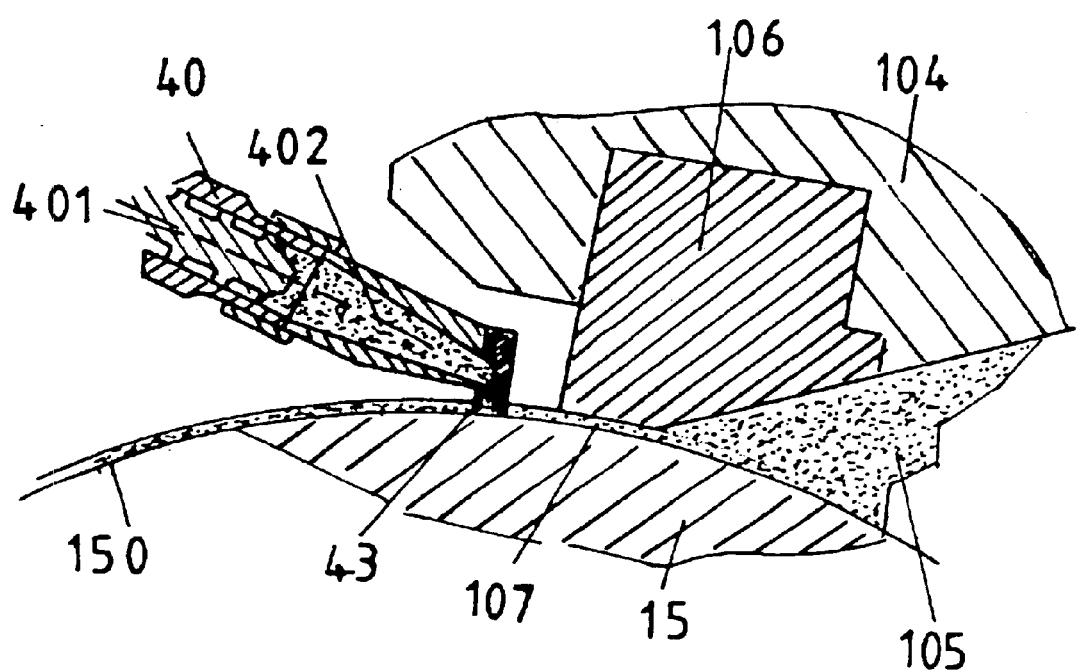
FIG. 3 is an enlarged view of the system for positioning the striation.

FIG. 2 shows a first extrusion device 10 which, by means of an extrusion helix 101, propels the unvulcanized rubber mix from which the inside portion 31 of the tread is to be made, into an extrusion head 102 delimited by vaults 103 and 104 and defining a flow channel 105 which on the one hand leads the mix to the rotating roller 15 associated with the extrusion machine 10, and on the other hand leads the said mix towards an extrusion orifice 107 delimited by the cylindrical surface 150 of the roller 15 and by the fixed wall of a blade 106. The said extrusion orifice gives the extruded mix its desired profile. Associated with this first extruder and roller is a micro-extruder 40 fitted on a support 41 which, either manually or according to a pre-established program, enables the said micro-extruder 40 to be moved in the three main directions. The micro-extruder (FIG. 3), which comprises a helix 401 and an extrusion head 402, has at its end a nozzle 43 attached to the outlet of the micro-extruder 40 and whose end is directed against the cylindrical surface 150 of the roller 15 downstream from the extrusion orifice 107. Thus, the said nozzle 43 can extrude the circumferential insert 12, with the desired profile and path, into the section of unvulcanized and hot mix emerging from the orifice 107 of the extruder 10.

As shown in FIGS. 4A to 4C, the said nozzle 43 comprises a contact surface 403 provided with orifices which allow the said nozzle 43 to be attached to the outlet of the extrusion head 402 of the micro-extruder 40. This contact surface extends axially to form a nozzle head 404 mainly comprising a feed chamber 405 with two compartments: a first, hollow compartment 406 of spherical shape, extended by a second compartment 407 of ovoid shape. The said chamber 405 has room for a slot 408 of height and width appropriate for the product 31 treated, which is split at the start by a cutting edge 409 constituting an integral part of the nozzle 404. In FIGS. 4B and 4C the arrows show the flow direction of the rubber mix 31 being treated.

We claim:

1. A tire comprising at least two layers of rubber mixes including a first layer and a second layer which do not conduct electricity, the said two layers having a common contact surface, wherein each layer contains a circumferential insert or striation of conductive mix which, on the contact surface has a circumferential footprint, the insert of the first of these layers having on the contact surface a circumferential footprint of circular path and of width e, the insert of the second layer having on the contact surface a circumferential footprint with a path of width e' which crosses and has crests on either side of the circular path of the insert of the first layer, such that circumferentially between the two paths there are numerous points of contact which ensure electrical connection between the two conductive inserts, and the path of the insert of the second layer has a maximum crest-to-crest amplitude at least equal to 10 mm.

2. The tire according to claim 1, wherein the path of the circumferential footprint of the insert of the second layer is a periodic path, defined by an amplitude a and a wavelength γ, the median axes of the two paths on the contact surface being parallel to and separated from the equatorial plane of the tire by distances whose difference is at most equal to half the amplitude a/2 of the said periodic path.

3. The tire according to claim 1, wherein the insert of each layer when viewed in cross-section, has a rectangular area throughout the thickness of the layer.

4. The tire according to claim 2, further comprising a crown reinforcement embodying metallic cables covered with a rubber mix which has been made conductive, wherein the two non-conductive layers are inner and outer portions of the tread, and electrical connection is ensured between the ground and the crown reinforcement.

5. The tire according to claim 2, further comprising a carcass reinforcement, a crown reinforcement and said at least two layers further comprises a third layer which does not conduct electricity and is a section of triangular shape separating the carcass reinforcement from an edge of the crown reinforcement wherein the non-conductive layers are inner and outer portions of the tread, and a connection is ensured between the three layers.

6. The tire according to claim 4, wherein the first layer provided with an insert having a circular circumferential path is the outer portion of the tread, and the second layer, provided with an insert having a periodic circumferential path, is the inner portion of the tread.

7. A process for production of an unvulcanized rubber layer provided with an insert having a circumferential and periodic path, comprising:

extruding the layer by an extruder comprising an extrusion head provided with a flow channel which opens into an extrusion orifice, positioning the layer on a conveyance means downstream from the extrusion orifice and cutting the layer by a cutting means to generate two walls of a cut, wherein the cutting means undergoes a periodic movement, and extruding an insert of conductive rubber mix wherein the rubber mix is in an unvulcanized condition and inserting the insert between the two walls of the cut by means of a nozzle of a movable micro-extruder, the said nozzle being directed against a wall of said conveyance means and undergoing a periodic movement parallel to said wall, the amplitude of the movement being at least equal to 10 mm.

8. The process according to claim 7 wherein the layer is in a tire tread.

9. The process according to claim 8, wherein the extruder comprises a roller die extruder, and wherein the conveyance means is a roller.

10. An apparatus for fabricating a layer provided with an insert with a periodic path, comprising an extruder with a roller die for extruding the layer in an unvulcanized condition on a roller, wherein the extruder comprises a main extruder from which unvulcanized rubber emerges and the extruder further comprises a micro-extruder fitted on a support, said support for inducing in the three main directions periodic movement to the micro-extruder, said micro-extruder comprising an extrusion head having at its end a nozzle for extruding a circumferential insert, such that the layer of unvulcanized rubber is provided with said insert having said periodic path into the unvulcanized rubber emerging from the main extruder.

11. The apparatus according to claim 10, wherein the nozzle further comprises a nozzle contact surface for fixing to an outlet of the extrusion head of micro-extruder, the nozzle contact surface being extended axially forming a nozzle head comprising a hollow feed chamber with a slot of height and width for shaping the insert, and a cutting edge for splitting the layer.

* * * * *